United States Patent Office 2,763,674
Patented Sept. 18, 1956

2,763,674

VINYL CHLOROSILANE-HYDROGEN SULFIDE REACTION PRODUCT

Marvin C. Brooks, Packanack Lake, and Ray K. Kuhns, Glen Rock, N. J., assignors to United States Rubber Company, New York, N. Y., a corporation of New Jersey No Drawing. Original application August 23, 1952, Serial No. 306,054. Divided and this application July 27, 1953, Serial No. 370,650

5 Claims. (Cl. 260—448.2)

This invention relates to a new class of rubber chemicals and to utilization of these chemicals in rubber-filler mixtures whereby vulcanizates having improved physical properties are obtained.

This application is a division of our copending application Serial No. 306,054 filed August 23, 1952.

The copending application of Brooks and Ewart, Serial No. 250,788, filed October 10, 1951, now abandoned, discloses that by incorporating the reaction products of organohalosilanes and polyhydric alcohols into uncured mixtures of rubber and certain fillers, an improvement in the physical properties of vulcanizates prepared therefrom is obtained.

We have now found that the addition of vinylchlorosilane-hydrogen sulfide reaction products (vinyl silthianes) to uncured rubber-filler mixtures also brings about improvements in the physical properties of the resulting vulcanizates. The improvements brought about by the vinyl silthianes are of the same nature as those obtained with vinylchlorosilane-glycol reaction products in accordance with the above-mentioned application. The beneficial effects of the vinyl silthianes are, however, of considerably greater magnitude. Moreover, where the vinylchlorosilane-glycol reaction products are effective, to any appreciable degree, only in rubber-filler mixtures in which the filler is a specific silica or silicate product, especially calcium silicate or kaolin (clay), the vinyl silthianes are effective in rubber-filler mixtures regardless of the type of filler contained therein. Of particular interest is the fact that the vinyl silthianes effect improvements in the properties of vulcanizates containing carbon black and calcium carbonate, whereas the vinylchlorosilane-glycol reaction products have virtually no effect on the physical properties of vulcanizates containing these types of fillers.

The copending applications of Brooks et al., Serial No. 256,144, filed November 13, 1951 (now U. S. Patent 2,665,264), Boggs, Serial No. 261,361 filed December 12, 1951, and Ladd, Serial No. 266,099, filed January 11, 1952, are all based upon the discovery that the physical properties of rubber-filler vulcanizates are improved by the use therein of fillers which have been pre-treated, or are treated during intermixture with the elastomer, with certain organohalosilanes. The improvements obtained by the use of the thus-treated fillers are the same as those obtained by the addition of a reaction product of the silane and a polyhydric alcohol directly to a rubber-filler mixture in the manner disclosed in the above-identified Brooks et al. application Serial No. 250,788, abandoned. It has heretofore been concluded from this similarity of results that the silane-polyhydric alcohol reaction product reacted with the filler in the elastomer-filler mixture and thereby effected a beneficial change in the reinforcing characteristics of the filler, similar to that which is obtained when the filler was treated with an organohalosilane prior to its addition to the rubber. Although we do not wish to be limited to any theory in the explanation of the results of our invention, it appears that the reaction of our vinyl silthianes in a rubber-filler mixture is generally similar to that of the silanepolyhydric alcohol reaction products.

The term "vinyl silthiane" as used herein denotes compounds of silicon wherein each silicon atom is chemically attached to at least one vinyl group and to at least one sulfur atom, the sum of vinyl groups and sulfur atoms so attached being equal to four.

The vinylchlorosilanes which we employ in making our silthianes are those in which all four valences of the silicon are satisfied by vinyl and chloro only.

In accordance with our invention we first react the vinylchlorosilane with hydrogen sulfide. This reaction is accompanied by liberation of an amount of hydrogen chloride corresponding to the amount of chlorine in the vinylchlorosilane and chemical attachment of the silicon atom to one, two or three sulfur atoms, depending upon the number of chlorine atoms originally present in the vinylchlorosilane.

For example when vinyltrichlorosilane is employed, the product of the reaction with the hydrogen sulfide contains the recurring unit structure

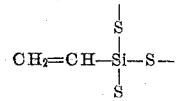

and analysis of the product shows that its content of carbon, hydrogen, silicon and sulfur responds to the empirical formula $CH_2=CHSiS_{3/2}$. Each of the dangling valences attached to sulfur in the foregoing unit structure is in turn attached to another silicon atom to which is attached a vinyl group.

In a typical method of preparing the reaction product of our invention, hydrogen sulfide in gaseous form is bubbled through a liquid mixture containing the vinylchlorosilane and a hydrogen chloride acceptor, preferably pyridine. It is preferable that an inert solvent for the reactants and for the vinylchlorosilane-hydrogen sulfide reaction product be present in the reaction vessel. Benzene is especially suitable as a solvent. An amount of hydrogen chloride acceptor should be used which is at least sufficient to combine with all of the hydrogen chloride evolved during the reaction. We prefer to effect reaction by heating the solution of the vinylchlorosilane, hydrogen chloride acceptor, and inert solvent under reflux conditions, and to bubble the hydrogen sulfide gas through the solution while it is being refluxed. If desired, any suitable means for obtaining intimate contact between the hydrogen sulfide gas and the liquid reaction mixture can be provided. As the reaction proceeds the reaction product of the hydrogen chloride acceptor and the liberated hydrogen chloride is of course formed and usually separates out as a precipitate. When the reaction is complete, as is indicated by cessation of absorption of hydrogen sulfide, the reaction product is recovered from the reaction mixture in any suitable manner. It is noteworthy that the hydrogen sulfide selectively reacts with the chlorine in the vinylchlorosilane so as to replace chlorine with sulfur and that almost no reaction of hydrogen sulfide across the double bonds of the vinyl groups takes place.

The following example illustrates the preparation of one of our vinyl silthiane reaction products in more detail.

Example 1

Six hundred grams of vinyltrichlorosilane and 960 grams of pyridine are dissolved in 1600 ml. of benzene. The mixture is then heated to reflux temperature and hydrogen sulfide is bubbled therethrough. As the reaction proceeds a heavy crystalline mass of pyridine hydrochloride forms. Introduction of the hydrogen sulfide is continued until its reaction with the silane ceases (as judged from bubble tubes for hydrogen sulfide located at the entrance to and exit from the reaction vessel).

When the hydrogen sulfide is no longer absorbed in the reaction mixture, the pyridine hydrochloride is filtered out and the filter cake washed in benzene. The wash fluid and the filtrate are then combined and the low-boiling fractions thereof removed by distillation at low pressure (30 mm.) and low temperature. The temperature is raised, during the course of the distillation, from 75° C. at the start to 125° C. at the finish.

The residue in the reaction vessel is the reaction product of our invention. It is a viscous liquid at 125° C. and a waxy solid at room temperature. It hydrolyzes in moist air, smells strongly of hydrogen sulfide, dissolves almost completely in xylene and dioxane, and swells slightly in paraffin hydrocarbons.

Analysis of the vinyltrichlorosilane-hydrogen sulfide reaction product indicates the unit structure is $CH_2=CHSiS_{3/2}$. The analytical data are summarized in the following table. The theoretical values in the table are based on a compound having the above unit structure.

| Element | Percent in Reaction Product | Percent Theoretical |
| --- | --- | --- |
| Chlorine | 0.4 | 0.0 |
| Sulfur | 42.3 | 46.5 |
| Silicon | 26.9 | 27.2 |
| Hydrogen | 3.1 | 2.9 |
| Carbon | 24.2 | 23.3 |

The yield of reaction product is 344 grams, compared to a theoretical yield of 384 grams.

The reaction products of divinyldichlorosilane, or trivinylchlorosilane, and hydrogen sulfide are prepared in similar fashion.

From the foregoing description many advantages of the present invention will be readily apparent to those skilled in the art. The principal advantage is that the present invention provides a simple and commercially feasible method of greatly improving the physical properties of synthetic rubber vulcanizates based on butadiene polymers and copolymers filled with the common fillers of the rubber industry. Another advantage is that the present invention makes it possible to prepare and market at relatively low cost a valuable new rubber chemical which can be used by rubber compounders in a way which does not require any extensive deviation from conventional compounding practices and which does not entail the use of special equipment. A marked advantage of our invention is that it enables considerable improvement in physical properties of vulcanizates containing such cheap and commonly available rubber fillers as carbon black and calcium carbonate which are not susceptible to improvement by treatment in accordance with the disclosures of the above-identified patent applications. Numerous other advantages of our invention will be apparent to those skilled in the art.

Having thus described our invention, what we claim and desire to protect by Letters Patent is:

1. The method which comprises passing hydrogen sulfide through a solution of vinyltrichlorosilane and pyridine in benzene heated under refluxing conditions until absorption of hydrogen sulfide ceases, and recovering from the reaction mixture the reaction product of said trichlorosilane and said hydrogen sulfide, said reaction product being a waxy solid at room temperature and a viscous liquid at 125° C., and having the empirical formula $CH_2=CHSiS_{3/2}$.

2. As a new composition of matter, a vinyl silthiane consisting of vinyl groups, silicon atoms and sulfur atoms, each of said silicon atoms being chemically attached to vinyl groups and sulfur atoms, the sum of the number of the vinyl groups and sulfur atoms to which each of said silicon atoms is attached being equal to four.

3. As a new composition of matter, a vinyl silthiane having the recurring unit structure

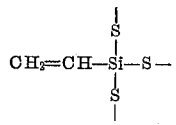

each of the dangling valences attached to sulfur in said unit structure being in turn attached to another silicon atom to which is attached a vinyl group, said silthiane having the empirical formula $CH_2=CH-Si-S_{3/2}$ and being a waxy solid at room temperature and a viscous liquid at 125° C.

4. The method which comprises bubbling gaseous hydrogen sulfide through a liquid comprising a vinylchlorosilane wherein the sum of the vinyl and chloro groups is equal to four, in the presence of a hydrogen chloride acceptor, at an elevated temperature until an amount of hydrogen chloride corresponding to the amount of chlorine in said vinylchlorosilane has been liberated and sulfur atoms equal in number to the number of chlorine atoms in said vinylchlorosilane have been chemically attached to each of the silicon atoms of said vinylchlorosilane, and recovering from the resulting reaction mixture the vinyl silthiane thereby formed.

5. The method which comprises bubbling gaseous hydrogen sulfide through a liquid comprising vinyltrichlorosilane and an inert solvent for the reactants and for the reaction product, in the presence of a hydrogen chloride acceptor, at an elevated temperature until an amount of hydrogen chloride corresponding to the amount of and three sulfur atoms have been chemically attached to each of the silicon atoms of said vinyltrichlorosilane, and recovering from the resulting reaction mixture the vinyl chlorine in said vinyltrichlorosilane has been liberated silthiane thereby formed.

References Cited in the file of this patent

UNITED STATES PATENTS 2,567,724    Moody _____ Sept. 11, 1951

FOREIGN PATENTS 138,357    Sweden _____ Dec. 9, 1952

OTHER REFERENCES

Burkhard: J. Am. Chem. Soc., vol. 72 (1950), pp. 1078–1080.